United States Patent
Tan et al.

(10) Patent No.: US 10,862,646 B2
(45) Date of Patent: Dec. 8, 2020

(54) POLAR CODED BROADCAST CHANNEL

(71) Applicant: Nokia Technologies Oy, Espoo (FI)

(72) Inventors: Jun Tan, Lake Zurich, IL (US); Jorma Johannes Kaikkonen, Oulu (FI); Sami-Jukka Hakola, Kempele (FI); Jie Chen, Schaumburg, IL (US)

(73) Assignee: Nokia Technologies Oy, Espoo (FI)

( * ) Notice: Subject to any disclaimer, the term of this patent is extended or adjusted under 35 U.S.C. 154(b) by 73 days.

(21) Appl. No.: 15/646,816

(22) Filed: Jul. 11, 2017

(65) Prior Publication Data

US 2019/0020447 A1    Jan. 17, 2019

(51) Int. Cl.
  *H04L 5/00*    (2006.01)
  *H04L 1/00*    (2006.01)
  *H04B 7/06*    (2006.01)

(52) U.S. Cl.
  CPC ............ *H04L 5/005* (2013.01); *H04L 1/0057* (2013.01); *H04L 1/0065* (2013.01); *H04B 7/0617* (2013.01); *H04L 5/0051* (2013.01); *H04L 5/0053* (2013.01); *H04L 2001/0093* (2013.01)

(58) Field of Classification Search
  CPC ....... H03M 13/09; H03M 13/13; H03M 13/29
  See application file for complete search history.

(56) References Cited

U.S. PATENT DOCUMENTS

| | | | | |
|---|---|---|---|---|
| 6,157,642 | A | * | 12/2000 | Sturza ............... H04B 7/18521 370/316 |
| 6,263,466 | B1 | * | 7/2001 | Hinedi ................. H03M 13/47 714/755 |
| 6,356,555 | B1 | * | 3/2002 | Rakib ................ H03M 13/256 370/441 |
| 8,843,150 | B2 | | 9/2014 | Yu et al. |

(Continued)

FOREIGN PATENT DOCUMENTS

WO    WO-2014116041 A1 * 7/2014 .......... H03M 13/296

OTHER PUBLICATIONS

Arikan, "Channel Polarization: A Method for Constructing Capacity Achieving Codes for Symmetric Binary-Input Memoryless Channels", IEEE Transactions on Information Theory, vol. 55, No. 7, Jul. 2009, pp. 3051-3073.

(Continued)

*Primary Examiner* — Parth Patel
*Assistant Examiner* — Berhanu D Belete
(74) *Attorney, Agent, or Firm* — Harrington & Smith

(57) ABSTRACT

Embodiments described herein encode data for multiple-segment transmission in a communication channel by encoding payload bits with an outer code and distributing the outer encoded payload bits to a plurality of N element coders, where N is an integer greater than one. At each of the N element coders the respectively input outer encoded payload bits are encoded with a respective element code. Outputs of the N element coders are encoded with an inner code such that the inner code applied to at least one of the (Continued)

outputs of the N element coders is a function of the output of at least one other of the N element coders. Finally, N discrete inner coded outputs are provided for transmission in respective N discrete segments of a wireless channel. The examples present polar element coders and the inner code combines outputs of certain element coders with an exclusive-OR function.

17 Claims, 7 Drawing Sheets

(56) References Cited

U.S. PATENT DOCUMENTS

| | | | | |
|---|---|---|---|---|
| 9,356,626 | B2* | 5/2016 | Alexeev | H03M 13/2906 |
| 9,473,276 | B2 | 10/2016 | Sajadieh et al. | |
| 10,498,481 | B2* | 12/2019 | Wu | H04L 1/0057 |
| 2003/0039306 | A1* | 2/2003 | Redfern | H04L 27/00 375/222 |
| 2006/0140401 | A1* | 6/2006 | Johnson | H04L 9/0625 380/44 |
| 2009/0022079 | A1 | 1/2009 | Zhou et al. | |
| 2013/0117344 | A1* | 5/2013 | Gross | H03M 13/1575 708/490 |
| 2014/0208183 | A1* | 7/2014 | Mandavifar | H03M 13/27 714/755 |
| 2014/0331083 | A1* | 11/2014 | Aliev | G06F 11/108 714/6.23 |
| 2014/0380114 | A1* | 12/2014 | Alexeev | H03M 13/2906 714/755 |
| 2016/0294418 | A1* | 10/2016 | Huang | H03M 13/13 |
| 2017/0126360 | A1* | 5/2017 | Millar | H04L 1/0045 |
| 2017/0353269 | A1* | 12/2017 | Lin | H03M 13/2933 |
| 2017/0359089 | A1* | 12/2017 | Lin | H04L 1/006 |
| 2018/0139758 | A1* | 5/2018 | Sankar | H04L 1/0023 |
| 2018/0167369 | A1* | 6/2018 | Shapira | H04W 12/1202 |
| 2018/0198555 | A1* | 7/2018 | Wu | H04L 1/0009 |
| 2018/0198560 | A1* | 7/2018 | Jiang | H03M 13/13 |
| 2018/0198894 | A1* | 7/2018 | Nammi | H03M 13/2906 |
| 2018/0199350 | A1* | 7/2018 | Wilson | H03M 13/6362 |
| 2018/0220305 | A1* | 8/2018 | Lei | H04W 72/005 |
| 2018/0262216 | A1* | 9/2018 | Noh | H03M 13/13 |
| 2019/0140784 | A1* | 5/2019 | Xi | H04L 1/0063 |
| 2019/0260501 | A1* | 8/2019 | Kim | H04L 1/0009 |
| 2019/0260623 | A1* | 8/2019 | Li | H04L 27/2627 |
| 2019/0319745 | A1* | 10/2019 | Pan | H04L 5/0053 |
| 2019/0357159 | A1* | 11/2019 | Pan | H04L 1/1861 |
| 2020/0021393 | A1* | 1/2020 | Noh | H04L 1/0061 |
| 2020/0186284 | A1* | 6/2020 | Noh | H04L 1/0067 |

OTHER PUBLICATIONS

"WF on NR-PBCH Evaluation", 3GPP TSG RAN WG1 #87, R1-1613480, Agenda: 7.1.2.2, NTT DOCOMO, Nov. 14-18, 2016, 3 pages.

"WF on Further Clarifications on NR-PBCH", 3GPP TSG-RAN1 meeting #87, R1-1613590, Agenda: 7.1.2.2, LG Electronics, Nov. 14-18, 2016, 5 pages.

"RAN1 Chairman's Notes", 3GPP TSG-RAN Working Group 1 meeting #89, May 15-19, 2017, 144 pages.

"Conveying Symbol Index During Multi-Beam Sync", 3GPP TSG-RAN Working Group 1 meeting #87, R1-1612034, Agenda: 7.1.2.4, Qualcomm Incorporated, Nov. 14-18, 2016, 3 pages.

"Coding Scheme for PBCH", 3GPP TSG-RAN Working Group 1 meeting #89, R1-1708836, Agenda: 7.1.4.3, Nokia, May 15-19, 2017, 7 pages.

"WF on Time Index Indication of SS Block", 3GPP TSG-RAN Working Group 1 Meeting RAN1#88bis , R1-1709442, Agenda: 7.1.1.1.3, Huawei, May 15-19, 2017, 4 pages.

"Initial Access Offline Outcome", 3GPP TSG-RAN Working Group 1 Meeting #88bis , R1-1706689, Agenda: 8.1.1.1, Dualcomm, Apr. 3-7, 2017, 3 pages.

"Final Report of 3GPP TSG RAN WG1 #87 v1.0.0", 3GPP TSG-RAN Working Group 1 Meeting #88, R1-1701552, MCC Support, Feb. 13-17, 2017, pp. 1-157.

"TCP Behavior and Latency Reduction", 3GPP TSG-RAN Working Group 1 Meeting #84, R1-161350, Agenda Item: 7.3.4.2, MediaTek Inc., Feb. 15-19, 2016, pp. 1-2.

* cited by examiner

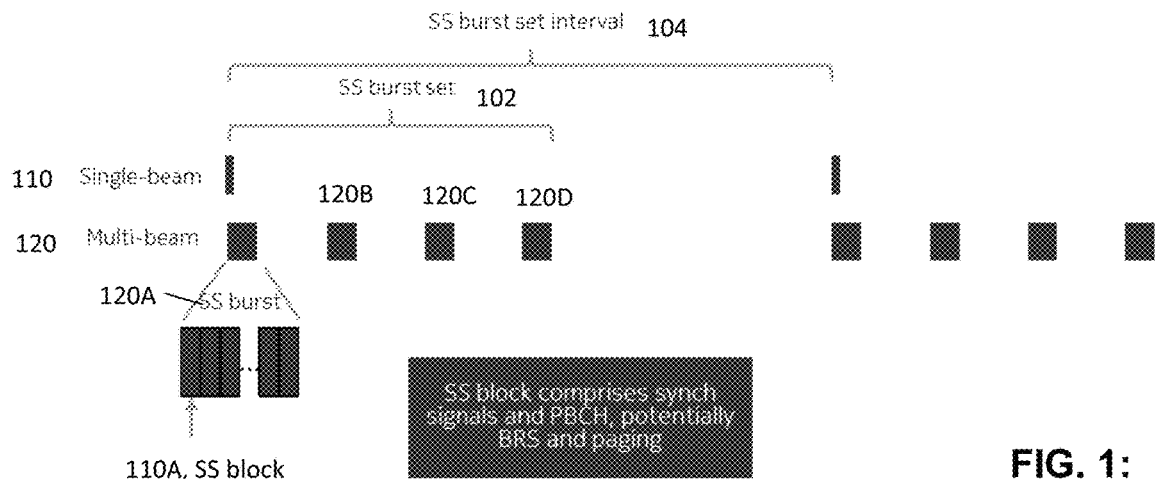
FIG. 1: PRIOR ART
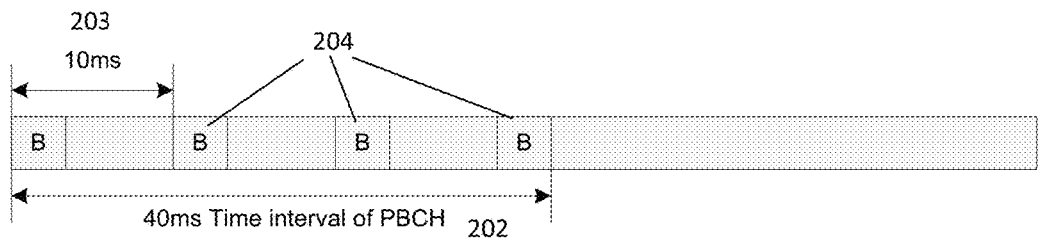
FIG. 2: PRIOR ART
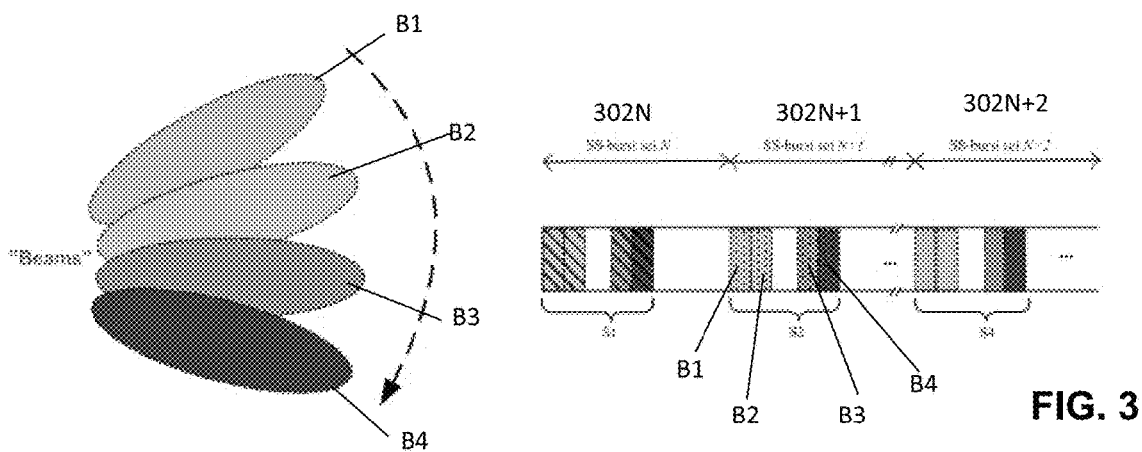
FIG. 3

POLAR CODED BROADCAST CHANNEL

TECHNOLOGICAL FIELD

The described invention relates to wireless communications, and more particularly to encoding a broadcast channel with a polar code.

BACKGROUND

The volume of wireless communications has expanded greatly in recent years and conventional wireless systems have been re-examined to address future needs driven by a larger number of wireless users and a higher volume wireless data. In this regard a new radio access technology (RAT) is being developed to eventually replace E-UTRA (commonly known as LTE). Variously referred to in its current state of development as new radio (NR) or 5G, one currently open study item for 5G/NR is considering polar codes as the channel coding scheme for the 5G-NR eMBB downlink (DL) and uplink (UL) control channels; see for example RAN1 #87 Chair notes, November 2016 (published as Draft Report of 3GPP TSG RAN WG1 #87 v0.1.0 at document R1-1701552 for 3GPP TSG RAN WG1 Meeting #88; Athens, Greece; 13-17 Feb. 2017). Polar code is a relatively new channel coding scheme that shows promise in approaching the communication channel capacity and is a linear block code developed by Erdal Arikan; see for example E. Arikan, *Channel polarization: A method for constructing capacity achieving codes for symmetric binary-input memoryless channels* [IEEE TRANS. INF. THEORY, vol. 55, no. 7; pp. 3051-3073; July 2009]. As a channel code, polar code exhibits an explicit construction to achieve channel capacity of symmetric binary-input, discrete, memoryless channels (BI-DMCs).

The broadcast channel is an important channel for 5G-NR design to carry broadcasting system information. The Chair notes mentioned above as well as 3GPP document R1-1613480 (*WF on NR-PBCH evaluation* by NTT DoCoMo; 3GPP TSG RAN WG1 #87; Reno, USA; 14-18 Nov. 2016] require the following design parameters to be considered for ongoing development of the NR primary broadcast channel (NR-PBCH):

Payload size

Overhead of PBCH including dedicated DMRS (time/frequency/port resource amount)

RS for demodulation, e.g., NR-PSS, NR-SSS or dedicated DMRS or mobility RS

Transmission scheme, e.g., MCS, transmit diversity

Periodicity

Resource mapping/multiplexing within SS block(s).

The Chair notes and 3GPP document R1-1613480 mentioned above further specify certain performance requirements for the NR-PBCH:

Following target requirements should be taken into account in the NR-PBCH design Detectable at low received baseband SNR condition such as [−6] dB Note: it does not mean NR-PBCH should be detectable by one-shot.

Further background relevant to these teachings can be seen at the following documents:

3GPP document R1-1613590 entitled *WF on further clarifications on NR-PBCH* [by LG Electronics, SONY and InterDigital; RAN1 #87; November 2016];

3GPP RAN1 #88 Chairman notes; February 2017;

3GPP document R1-1612034 entitled *Conveying symbol index during multi-beam Sync* [by Qualcomm; RAN1#87; November 2016].

Embodiments of these teachings provide a unique way to utilize polar codes for the broadcast channel in a wireless system, and are seen to be particularly useful for deployment in NR/5G systems in correspondence with the NR-PBCH.

SUMMARY

According to a first aspect of these teachings there is a method to encode data for multiple-segment transmission in a communication channel, the method comprising: encoding payload bits with an outer code and distributing the outer encoded payload bits to a plurality of N element coders (N is an integer greater than one); at each of the N element coders, encoding the respectively input outer encoded payload bits with a respective element code; encoding outputs of the N element coders with an inner code such that the inner code applied to at least one of the outputs of the N element coders is a function of the output of at least one other of the N element coders; and providing N discrete inner coded outputs for transmission in respective N discrete segments of a wireless channel.

According to a second aspect of these teachings there is an apparatus, such as an encoder for a network radio access node or components thereof, comprising at least one computer readable memory storing computer program instructions and at least one processor. The computer readable memory with the computer program instructions is configured, with the at least one processor, to cause the apparatus to perform actions to encode data for multiple-segment transmission in a communication channel, where the actions comprise: encode payload bits with an outer code and distribute the outer encoded payload bits to a plurality of N element coders; at each of the N element coders, encode the respectively input outer encoded payload bits with a respective element code; encode outputs of the N element coders with an inner code such that the inner code applied to at least one of the outputs of the N element coders is a function of the output of at least one other of the N element coders; and provide N discrete inner coded outputs for transmission in respective N discrete segments of a wireless channel.

According to a third aspect of these teachings there is a computer readable memory storing computer program instructions that, when executed by one or more processors, cause an apparatus such as a network radio access node to perform actions to encode data for multiple-segment transmission in a communication channel that include: encode payload bits with an outer code and distribute the outer encoded payload bits to a plurality of N element coders; at each of the N element coders, encode the respectively input outer encoded payload bits with a respective element code; encode outputs of the N element coders with an inner code such that the inner code applied to at least one of the outputs of the N element coders is a function of the output of at least one other of the N element coders; and provide N discrete inner coded outputs for transmission in respective N discrete segments of a wireless channel.

According to a fourth aspect of these teachings there is a method comprising: parsing a broadcast channel into N discrete segments, where N is an integer greater than one; encoding payload bits with a plurality of N element coders that each apply a polar code; and mapping respective outputs of the N element coders to respective ones of the N discrete segments of the broadcast channel for transmission. This fourth aspect may also be implemented as an apparatus such as the above-referenced encoder for a network radio access node, or as a computer readable memory storing computer program instructions that cause such a network radio access node to perform these actions.

According to a fifth aspect of these teachings there is a method comprising: encoding payload bits with a plurality of N element coders; encoding outputs of the N element coders with an inner code to produce N inner coded outputs such that (N−1) of the inner coded outputs encodes the combined outputs of more than one of the N element coders; and providing the N inner coded outputs for transmission on a wireless channel. This fifth aspect may also be implemented as an apparatus such as the above-referenced encoder for a network radio access node, or as a computer readable memory storing computer program instructions that cause such a network radio access node to perform these actions.

According to a sixth aspect of these teachings there is a method comprising receiving from M respective transmit beams M respective segments of a downlink channel in which each segment is differently encoded, where M is an integer greater than one and at least one of the M segments is received at a higher power than any other of the M segments; and using redundancy combining of multiple received segments to decode the encoded information bits. This sixth aspect may also be implemented as an apparatus such as the above-referenced encoder for a network radio access node, or as a computer readable memory storing computer program instructions that cause such a network radio access node to perform these actions.

In a more particular embodiment of the sixth aspect, N is a maximum number of segments of the downlink channel where N is an integer equal to or greater than M; and a size of a burst per segment is N synchronization signal blocks. Further in this particular embodiment, using the redundancy combining to decode the M segments comprises at least one of:
- determining for each of the M segments a respective block index of the N synchronization signal blocks by determining a number of the respective segment and decoding a payload of the respective segment to determine an index of the burst; and
- determining for each of the respective M segments a respective block index of the N synchronization signal blocks within the respective burst by determining a number of the respective segment and thereafter determining an index of the respective burst from signaling associated with the downlink channel.

These and other aspects are more particularly detailed below.

BRIEF DESCRIPTION OF THE DRAWINGS

FIG. 1 is a schematic diagram illustrating a prior art example of a secondary synchronization signal block and burst and burst set for single and multi-beam operation in the 5G/NR radio access technology.

FIG. 2 is a schematic diagram illustrating structure of the physical broadcast channel in the LTE system.

FIG. 3 is a schematic diagram illustrating conventional beamformed transmission of the physical broadcast channel by sweeping narrow beams.

DETAILED DESCRIPTION

Figure 4:
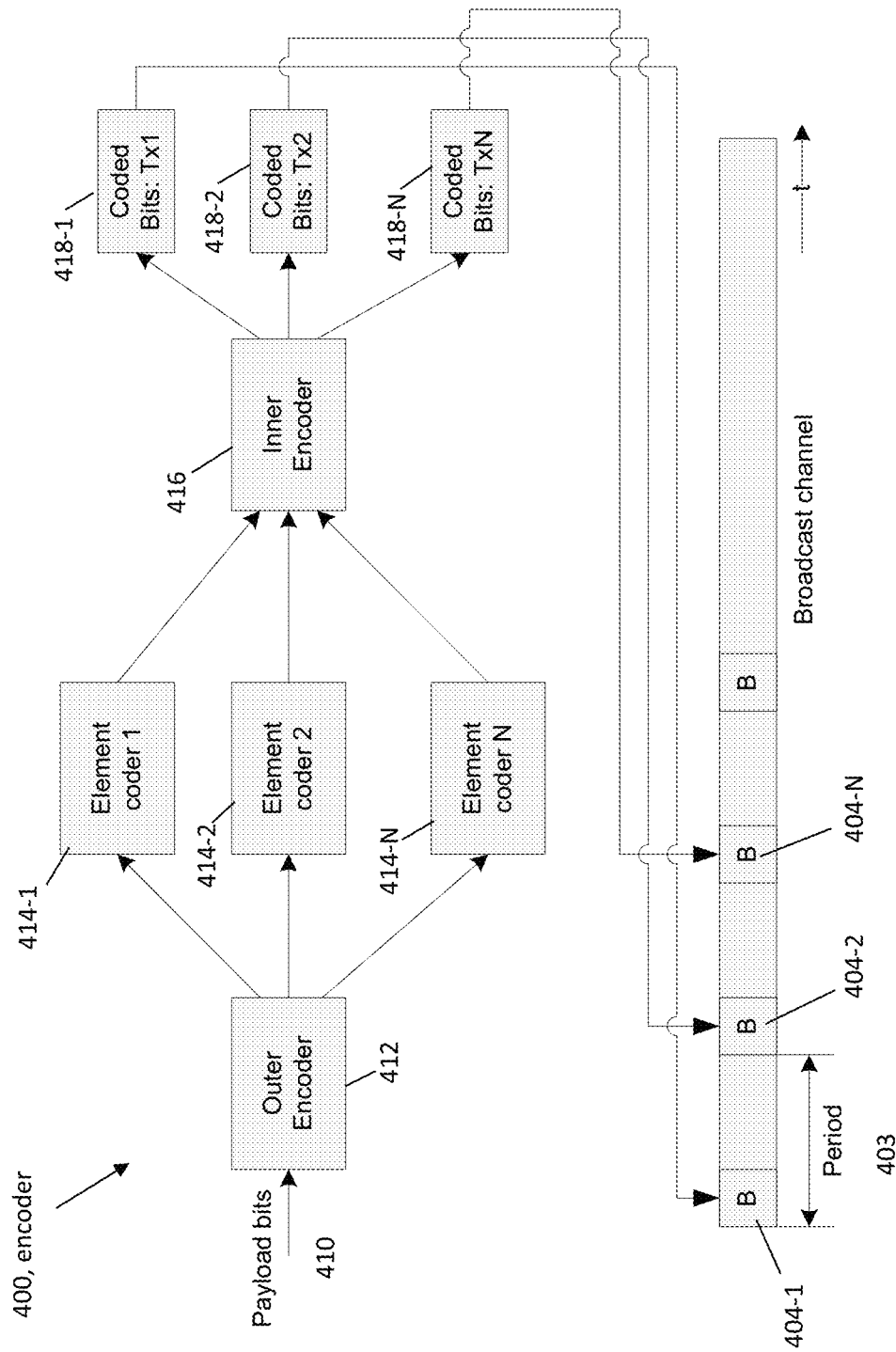
FIG. 4 is a schematic diagram illustrating an encoder employing an outer-element-inner coding paradigm according to example embodiments of these teachings.

The description below assumes a broadcast channel PBCH in a wireless network utilizing the NR-5G radio access technology (RAT), and so certain names and acronyms are specific to that RAT but this is only an example and not a limitation to the broader teachings herein which are not specific to any particular RAT. From the inventors' perspective the greatest advantages of these teachings are achieved by deployment on the broadcast channel but more generally the coding concepts detailed herein can be utilized with other downlink channels in a wireless communication system.

The framework of these teachings on which the more specific examples below are built is to utilize polar code to encode the payload information bits for multiple transmissions/segments over a broadcast channel. This can be regarded as following a paradigm structure of outer code—element codes—inner code. In this regard it is quite different from the prior art approach of transmitting repetitive coded information over periodic broadcast channel segments, which is the structure of the broadcast channel in legacy LTE. At different transmission intervals of the broadcast channel encoded according to these teachings, the transmitted codewords are different. One important difference of a broadcast channel encoded according to these teachings over a more conventional broadcast channel coding design is that for these teachings coded bits for different transmissions (segments) are provided based on the polar code incremental redundancy (IR) scheme. Also detailed below is a more detailed inner encoder design to ensure good decoding performance of the broadcast channel; and some receiver/detection schemes are proposed that combine redundancy over multiple segments to achieve such decoding performance at the receiver side.

With this framework in mind, now consider some problems that arise if one were to try to incorporate the broadcast channel of the LTE system into the NR-5G system in view of the requirements set forth in the background section above for the NR-PBCH. Generally speaking the broadcast channel is a downlink control channel to broadcast system information to all user equipments (UEs) in the network. UEs shall be able to receive system information from the broadcast channel for successive processes, such as initial uplink access, transmissions on the random access channel (RACH), and so forth.

Specific to the NR-PDCH the RAN1 #87 Chair notes and 3GPP document R1-1613590 set forth further factors to consider for its design:

Consider followings for minimum system information transmission:
NR-PBCH is a non-scheduled broadcast channel carrying at least a part of minimum system information with fixed payload size and periodicity predefined in the specification depending on carrier frequency range
Alt. 1: NR-PBCH carries a part of minimum system information
Alt 1-1: remaining minimum system information is transmitted via other channel at least partially indicated by NR-PBCH
Alt 1-2: Remaining minimum system information is transmitted via other channel not indicated in NR-PBCH
Alt. 2: NR-PBCH carries all of minimum system information
Study further NR-PBCH design examples with the following clarification of the agreements
Example 1 for Alt. 1-1: NR-PBCH carries a part of minimum system information including information necessary for the UE to receive channel carrying remaining minimum system information
Example 2 for Alt. 1-1: NR-PBCH carries information necessary for the UE to perform initial UL transmission (not limited to NR-PRACH, e.g. PRACH msg. 1) and possibly information necessary to receive the response to initial UL transmission (e.g., PRACH msg. 2) in addition to information in Example 1
Example 3 for Alt. 2: NR-PBCH carries all minimum system information
Example 4 for Alt. 1-2: NR-PBCH carries information necessary for the UE to perform initial UL transmission (not limited to NR-PRACH, e.g. PRACH msg. 1) and information necessary to receive the response to initial UL transmission (e.g. PRACH msg. 2)
Information necessary to receive remaining minimum system information is provided after initial UL transmission
Other examples are not precluded
Prepare draft LS to RAN2 to clarify the contents and RAN2 preferred size of minimum system information and whether it can be delivered by on demand.

The NR-PBCH will thus have a fixed payload size and will be predefined periodically in time and frequency. The payload shall hold at least the minimum system information, which may enable UE to receive full system information, or may enable uplink initial access (RACH). The periodicity of the NR-PBCH is to be predefined in the specification depending on the carrier frequency range.

Two significant aspects of the 5G/NR RAT are that it will utilize multiple input multiple output (MIMO) techniques to a much more substantial degree than LTE, and at least some of the 5G/NR carriers are to be in the mmWave frequency range (even greater than 40 GHz). In the context of MIMO transmission on such high frequency carriers it is possible to have a precoded (beamformed) NR-PBCH design that would be allocated periodically for each beam to ensure proper coverage and these broadcasting beams would sweep the covered area.

In general for nearly any broadcast channel the two key design factors are payload and overhead. Designing a large payload capacity enables the UEs listening to this broadcast channel to obtain complete system information by which they can initiate a RACH process to obtain a connection with the radio network, for example to make or answer a voice call. But such larger payloads necessarily entail higher signaling overhead which will have a negative impact on the overall system-level spectrum efficiency. For the NR-PBCH specifically there is an agreed amount of minimum system information that must be transmitted. This minimum system information payload represents a minimum NR-PBCH overhead but for a beamformed NR-PBCH as noted above the overhead could be even higher due to the periodic allocation of NR-PBCH for sweeping beams in the network.

In addition to system information, UEs that do not have an active connection with the radio network also need to obtain synchronization signals (primary synchronization PS and secondary synchronization SS signals) and in the NR RAT also beam reference signals (BRS or CSI-RS) to enable proper beamforming. In NR the SS is to be transmitted as a block, and from this a related problem arises concerning the indication of the SS block index. In one SS burst set, synchronization signals and PBCH are transmitted throughout the whole sector. FIG. 1 illustrates that in the single-beam configuration 110 the SS burst set 102 comprises one SS block 110A (and one SS burst) whereas in the multi-beam configuration 120 the SS burst set 102 comprises multiple SS blocks 120A (potentially multiple SS bursts 120B, 120C, 120D). There may additionally be repetitions of one or more of these SS blocks, for example within a given SS burst set 102. 3GPP document R1-1612034 (see background section) proposes to use circular shifts of the code word to convey the SS-block index. The unresolved point at the current stage of 5G/NR development is how a UE is to get its slot/subframe synchronization; that is, the UE should be able to know in a spectrum efficient way which SS block it has detected.

FIG. 2 is a prior art illustration of the PBCH design; it has a transmission time interval 202 of 40 ms and one PBCH payload 204 (which is a self-decodable unit) is allocated in each of multiple 10 ms periods 203. The PBCH payload is encoded with tail-bite convolutional code (TBCC), and the coded bits are divided into four segments of the 40 ms PBCH time interval 202, one per period. Each of the illustrated PBCH payloads may be considered a PBCH segment. A specific frequency region (40 resource elements or REs) is allocated to each PBCH segment for transmission of the payload 204. The PBCH transmission over multiple PBCH periods 203 can be considered as "repetition" coding in general. A similar design principle can be used for the NR-PBCH, with an alternative periodicity as suggested at 3GPP document R1-161350 (see the background section). In general, this design can be considered as the repetition coding scheme on top of the individually coded segments, similar to that of LTE.

In embodiments of these teachings, such a repetition coding scheme lies on top of the polar-coded payload of the broadcast channel, as further detailed below to exploit beamforming aspects. The repetition coding is over a specified periodicity, which in some embodiments that periodicity depends on the frequency range in which the broadcast channel is transmitted.

Now consider the beamforming aspects of these teachings. FIG. 3 illustrates a generic example of a precoded/beamformed PBCH where the different beams are 'swept' across the cell to ensure all the UEs under a given beam can receive it. Each beam is transmitting at least one PBCH to ensure UEs looking to receive that beam have an opportunity to read system information. During a first burst set 302N the synchronization signals are transmitted in different time slots by the four different beams in order, where the beams are shown as B1, B2, B3 and B4. Each subsequent burst set 302N+1, 302N+2, etc. are transmitted in the subsequent period as shown, each with the same structure of time division between the transmissions by the different beams B1-B4. In this manner, the beams B1-B4, which are narrow beams and each cover only a portion of the cell's geographic area, are swept across the entire geographic region of the cell in each periodic interval. One group of UEs clustered in one sub-region of the cell will be looking to receive B1 and will have at minimum one opportunity to do so per interval, and the same for a second group of UEs clustered in a different sub-region of the cell and looking to receive B2, and so forth. The assumption for FIG. 3 is that it takes the four illustrated narrow beams to cover the entire region of the cell, but of course in other embodiments a larger number of narrow beams can be used to sweep the cell and in some embodiments the sweeping is in three dimensions rather than only two in which case at least some of the beams will cover different altitude ranges while having at least partially overlapping azimuth ranges.

FIG. 4 is a schematic diagram of an encoder 400 according to embodiments of these teachings. FIG. 4 illustrates more particularly the new multi-segment polar encoding scheme for the broadcast channel, the inner encoder and element coders and outer encoder for encoding payload bits for transmission on that broadcast channel, and explains a detailed inner encoder design to ensure good decoding performance of that transmitted broadcast channel, all in accordance with a non-limiting embodiment of these teachings. In these non-limiting examples are described some examples of detection schemes at the receiver of the UE to combine redundancy over multiple segments. The broadcast channel (PBCH) at FIG. 4 is illustrated similarly as FIG. 2, with one segment 404-1, 404-2, 404-N of the PBCH payload transmitted in each of the PBCH transmission time periods 403.

In the FIG. 4 example a polar code is used to encode the payload information bits 410 for multiple transmissions/segments 404-1, 404-2, 404-N over a broadcast channel in which the structure of the encoding scheme is: outer code-element codes-inner code structure. This differs substantially from the traditional PBCH encoding in legacy LTE in which repetitive coded information is transmitted over periodic broadcast channel segments. At different transmission periods 203 of the broadcast channel, the transmitted codewords are different. The coded bits for different transmissions (segments 404-1, 404-2, 404-N) are provided based on the polar code incremental redundancy (IR) scheme, and this incremental redundancy is fundamentally different from the conventional LTE channel coding design for the broadcast channel.

FIG. 4 illustrates that the multiple transmission broadcast channel can be modelled with the inner/outer coding model, with an outer encoder 412, multiple element coders 414-1/414-2/414-N, and an inner encoder 416 to distribute coded bits to various broadcast channel transmissions 404-1/404-2/404-N. The payload bits 410 (information bits to be encoded) are input to an outer encoder 412 component of the overall encoder 400 which encodes and/or distributes the payload information for multiple element codes, each of which corresponds to one segment or period 403 of the broadcast channel. The outer encoder 412 in general can use any error-correcting codes, such as repetition code or cyclic redundancy check (CRC) code. When a repetition code is used, the outer encoder 412 simply distributes the input information bits 410 to all of the element coders 414-1/414-2/414-N.

The elements coders 414-1/414-2/414-N correspond to segments 404-1/404-2-404-N (or periods 403, since there is one payload segment per period) of the broadcast channel. FIG. 4 assumes there are N segments in each transmission interval (202, FIG. 2) for the broadcast channel where N is an integer greater than one, and so a total of N element coders are used. In one particular example most suitable for 5G/NR, the element coders 414-1/414-2/414-N are polar encoders. In other embodiments these element coders 414-1/414-2/414-N can use another type of error-correcting codes. In general, these element coders 414-1/414-2/414-N can be different but in the FIG. 4 example assume that these element coders 414-1/414-2/414-N are all using one polar code.

The inner encoder 416 may for example utilize a cross-element-code coding scheme to ensure proper transmission of redundancy of encoded bits over the segments 404-1/404-2/404-N. The coded bits 418-1, 418-2, 418-N shown at FIG. 4 is not an additional encoding step beyond the inner coder 416 but merely illustrates distribution of differently-coded bits for transmission in different segments 404-1, 404-2, 404-N of the broadcast channel. For the first transmission of the first segment 404-1, the coded bits 418-1 are represented as the Tx1 coded bits and will be directly transmitted. For other segments 404-2, 404-N, the transmitted bits 418-2, 418-N will be a function of the encoded bits in the current transmission together with previously encoded bits, as FIG. 5 will demonstrate by example. This process is similar to an "inner encoder" from a general channel coding point of view. FIG. 4 further shows that the inner encoder 416 also distributes the differently coded bits 418-1, 418-2, 418-N to the corresponding different segments 404-1, 404-2, 404-N (or periods 403) of the broadcast channel. The different segments 404-1, 404-2, 404-N of the broadcast channel may have different lengths to ensure a lower NR-PBCH overhead.

Figure 5:
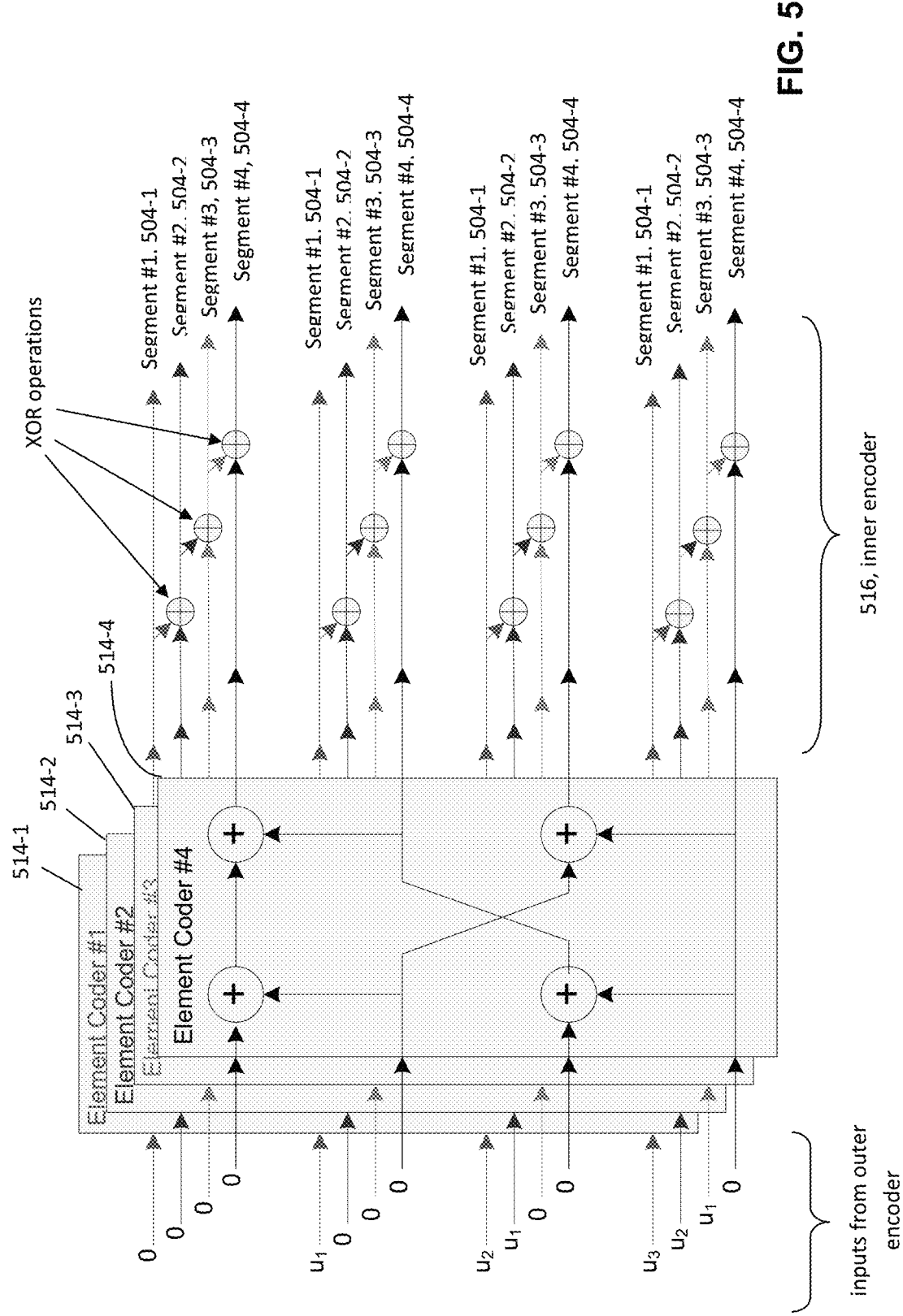
FIG. 5 is a schematic diagram showing the element coders and the inner coder of FIG. 4 according to a specific and simplified embodiment of these teachings where N=4.

FIG. 5 is an exemplary schematic diagram of element coders and an inner encoder 416 such as the one described above for FIG. 4, and to better demonstrate the concept FIG. 5 makes two assumptions: 1) a very short polar code imposed by the element coders 414-1, 414-2, 414-N explained above for FIG. 4, and 2) there are N=4 segments of the encoded payload bits to be distributed in the transmission time (202, FIG. 2) of the broadcast channel. This means there are a total of N=4 element coders 514-1, 514-2, 514-3 and 514-4 whose output coded bits correspond to different ones of N=4 segments (#1, #2, #3 and #4 at FIG. 5) of the broadcast channel. The input bits from the left of FIG. 5 come from the outer encoder (412 of FIG. 4) and the operations shown at FIG. 5 on the bits that are output from the element coders 514-1, 514-2, 514-3 and 514-4 represent coding by the inner coder 516.

FIG. 5 shows that the first element coder 514-1 sends polar coded bits to the first segment #1 of the broadcast channel. In the FIG. 4 illustration these are the coded bits Tx1. The polar coded bits that are output from the second element coder 514-2 will be XORed (exclusive OR operation) by the inner coder 516 with the coded bits of the first transmission/segment #1 to produce the coded bits (Tx2 in FIG. 4) that are transmitted in the second segment #2 of the broadcast channel. For the third segment #3, the polar coded bits that are output from the third element coder 514-3 will be XORed with the coded bits of the second transmission/segment #2 to produce the coded bits (TxN of FIG. 4) that are transmitted in segment #3 of the broadcast channel. And finally for the fourth segment #3, the polar coded bits that are output from the fourth element coder 514-4 will be XORed with the coded bits of the third transmission/segment #3 to produce the coded bits that are transmitted in segment #4 of the broadcast channel. This specific example is the basis of the quantitative simulation data shown at FIGS. 7A-B.

The above specific example is only one non-limiting embodiment for the design of the inner encoder 516. In other example implementations of the inner coder 516 the coded bits that make up the third segment #3 can be the results of XOR operations between the output of the first element coder 514-1 and of the third element coder 514-3, and the coded bits of the fourth segment #4 can be the result of XOR operations on the outputs of the first element coder 514-1 and of the fourth element coder 514-4. This particular example enables the direct redundancy improvement for the first transmission/first segment #1. In another embodiment, the element codes/sub-polar codes used in each different segment's transmission can be separately optimized, in which case the same polar code Is not used by each of the element coders 514-1, 514-2, 514-3, 514-4.

As the above examples demonstrate there are a variety of ways to implement the element coders and the inner coder. As a general principle, the inner coder operates so as to distribute a first set of coded bits from one of the element coders to a first segment/period of the broadcast channel, and to distribute other sets of coded bits from corresponding other of the element coders to corresponding other segments/periods of the broadcast channel, where at least some of the other sets of coded bits are encoded in dependence on one or more of the first and/or other sets of the coded bits that were generated and/or transmitted previously.

For higher carrier frequencies contemplated for 5G/NR, for example greater than 6 GHz, a precoded/beamformed PBCH would be applied to ensure adequate broadcast channel coverage. Usually the beamformed PBCH will be swept across all beams in the intended coverage area as is described above in general for FIG. 3 which has all segments S1, S2, . . . S4 of the PBCH transmitted by each narrowband beam B1, B2, B3, B4. Considering the number of sweeping beams to cover the geographic region of a cell in a 6 GHz PBCH scenario, transmitting a PBCH with the coding approach detailed above would require a high signaling overhead using the FIG. 3 technique.

Figure 6:
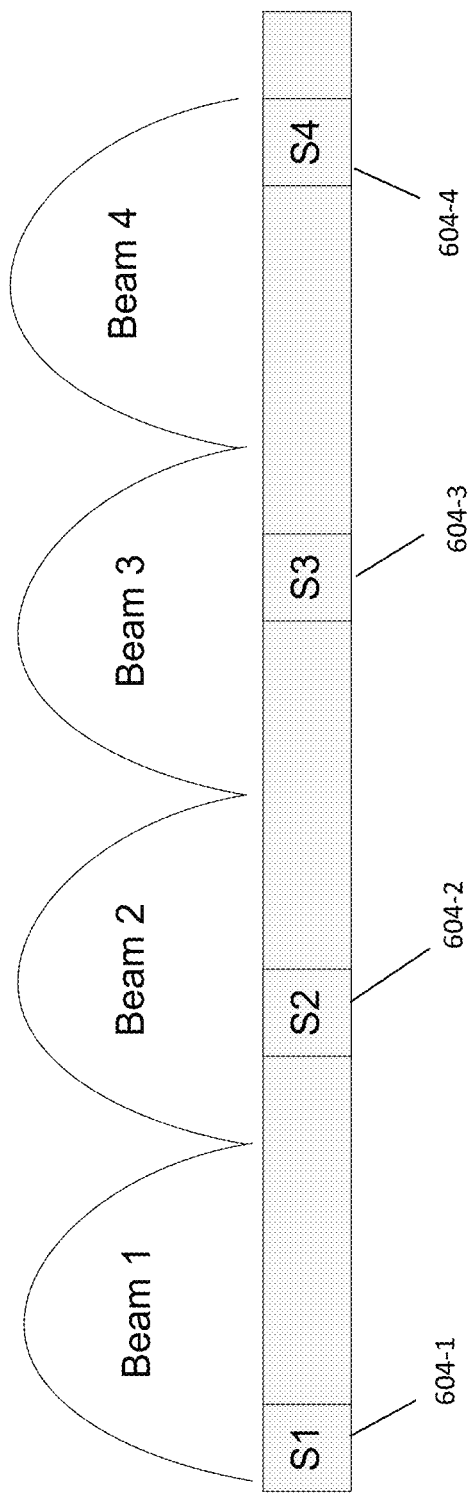
FIG. 6 is a schematic diagram illustrating beamforming the NR-PBCH that is encoded according to these teachings, in a particular embodiment for how the encoded bits are transmitted.

FIG. 6 is a schematic diagram of the PBCH with N=4 segments per (40 ms) transmission time to address this high overhead when the PBCH uses the polar coded multiple-transmission as detailed above. Specifically, only one segment of PBCH is used at each sweeping beam. The NR-PBCH segments are encoded with the general approach shown in FIG. 4 and detailed by non-limiting example at FIG. 5. For simplicity in FIG. 6 there are a total of four narrow beams shown and four PBCH segments 604-1, 604-2, 604-3, 604-4 that correspond to four different element coders in the encoder 400.

While FIG. 6 illustrates four beams for simplicity, in practice the 5G/NR system is to employ a quite large number of beams per cell so in a practical deployment the total number of beams covering the cell would be (roughly) divided into four and each of these sets of beams would transmit only one of the PBCH segments 604-1, 604-2, 604-3, 604-4. More generally the number of narrow beams needed to cover the cell would divided into N, the total number of different segments by which the encoded payload bits are transmitted (N is also the number of element coders). Because the sweeping beams are usually dense in 5G/NR with a large number of antenna elements associated with the network radio access node (termed a gNB in 5G/NR), a UE can monitor multiple beams with variable receive power.

Thus for example a UE in the coverage area of beam 2 in FIG. 6 will receive segment #2 604-2 from its designated beam 2 but will likely also be able to also receive transmissions of one or more other segments 604-1, 604-3, 604-4 transmitted from the other beams 1, 3, 4. When multiple PBCH segments are received by a given UE at different transmit and receive beams, the UE can combine the redundancy from different segments 604-1, 604-2, 604-3, 604-4 of the NR-PBCH to improve detection and decoding. Compared with the typical PBCH design and transmission scheme, this would greatly reduce the signaling overhead for transmitting the NR-PBCH as encoded according to these teachings.

Recall from FIG. 1 that in one SS burst set the synchronization signals and the PBCH are transmitted throughout the whole sector, where in a single beam configuration the SS burst set comprises one block while in a multi-beam configuration the SS burst set comprises multiple SS blocks and possibly also multiple SS bursts. In embodiments of these teachings, to signal the SS block index (which gives the slot/subframe timing) to UEs, the SS burst set where each SS block carries NR-PBCH is divided into SS bursts where the SS burst size as defined in number of SS blocks is the same as the maximum number of segments defined for NR-PBCH. In the examples at FIGS. 5-6 above that maximum number of segments is N=4. In this regard there are several different ways to indicate the SS block index. For example, in a first implementation the UE determines the SS block index within the SS burst by determining the segment number, and the UE can determine the SS burst index from decoding the PBCH payload. In an alternative second implementation the UE can determine the SS block index within SS burst by determining the segment number, and the UE can determine the SS burst index by detecting the SS burst index from the associated signaling transmitted alongside the PBCH.

In another embodiment, the PBCH segments can be mapped into the SS blocks within one or multiple SS burst set.

The above examples are from the encoding perspective but the decoding and redundancy combining at the UE that receives the PBCH are fairly straightforward from that encoding. For example, for each received segment, the coded bits can be decoded separately. The decoding and redundancy combing can then follow a procedure such as:
   a. Decode the data in the $N^{th}$ (last) segment and make hard decisions on the values of the decoded bits; and
   b. Use that $N^{th}$ segment decoded data as 'frozen' bits to decode the $(N-1)^{th}$ segment data, and repeat for each progressively-earlier $(n-1)^{th}$ data until the first transmission is decoded (this assumes the specific XOR paradigm described with reference to FIG. 5; slight alterations would accommodate where there is not progressive XORing of each current segment with its immediate predecessor segment).

In this regard the decoded bits of the first transmission are the output of the decoding.

Other redundancy combing and decoding schemes are possible. As another example an alternative decoding process can utilize joint list decoding, following a procedure such as:
   a. List-decode the $N^{th}$ transmit segment data and keep the hard and soft outputs in all lists;
   b. Continue the list-decoding for the $(N-1)^{th}$ transmit segment data by using the hard and soft outputs of the previous transmission. Still keep the resulted $(n-1)^{th}$ transmit hard and soft outputs in all lists. Repeat the same procedure for all remaining transmission segments;

c. Make a hard decision for each information bit only when the first transmission is decoded.

Exemplary embodiments of these teachings provide the technical effect that the coding design ensures good decoding performance, as shown via the simulation results below plotted at FIGS. 7A-B. A further technical effect is that the inner and outer codes can be separately designed to further improve performance. Additionally, the coding design presented herein can support any rates and code block sizes in each segment, with proper inner and outer code designs. As is evident from the use of N in describing the examples above these coding techniques can be used for any arbitrary segmentation (number of segments) of NR-PBCH.

Figure 7A:
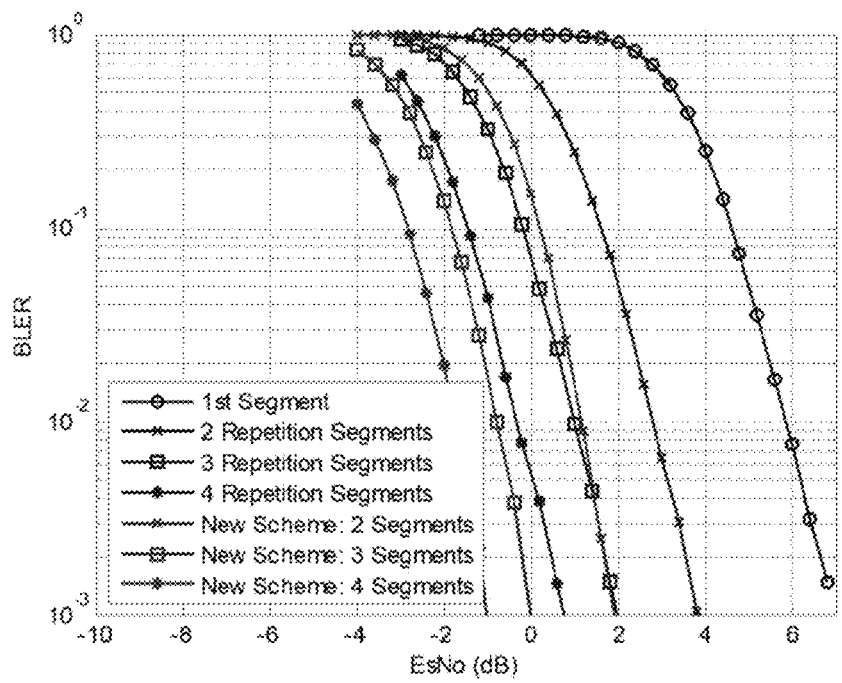
FIG. 7A is a data plot comparing block error rate as simulated for these teachings versus conventional repetitive segmentation of the PBCH at a high coding rate.
Figure 7B:
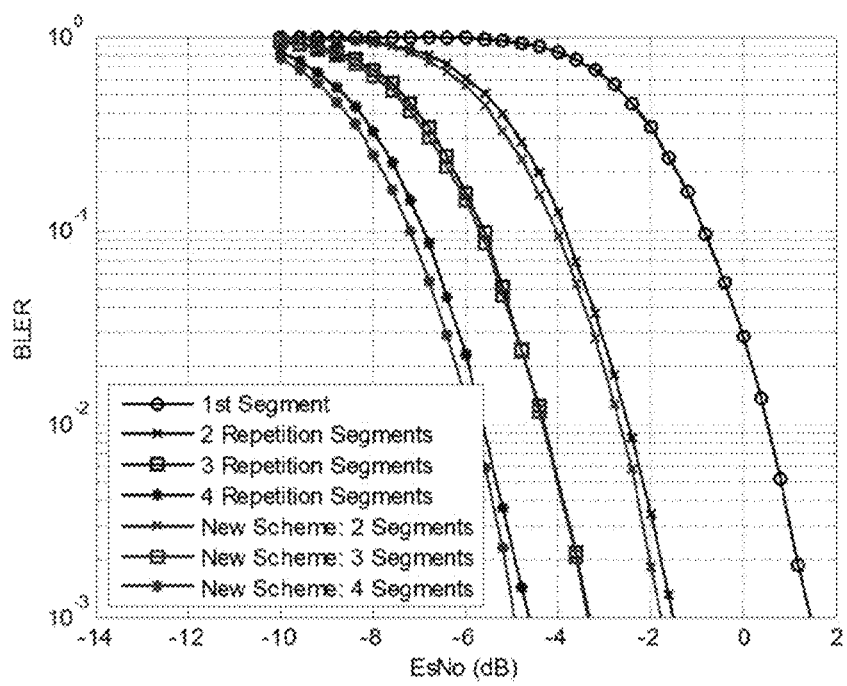
FIG. 7B is similar to FIG. 7A but the data plot is for a low coding rate.

Simulation results for block error rate (BLER) are shown at FIGS. 7A-B for the coding technique detailed herein using a polar code for the element coders as compared to conventional LTE repetitive coding for the different PBCH segments. FIG. 7A compares the block error rate (BLER) performance of LTE's repetitive segments against the coding scheme detailed herein for a case where there are a total of 96 payload bits that result in a total of 128 coded bits, with a maximum of 4 segments of NR-PBCH. The code rate is 3/4 to represent a high coding rate. The coding scheme detailed herein and plotted at FIG. 7A as the 'new scheme' data points always outperforms even polar coded NR-PBCH that utilizes repetitive segments as does LTE. The gain is >=2 dB against repetitive segments for 1/2/3 segment combining, as FIG. 7A illustrates.

FIG. 7B illustrates similar to FIG. 7A but using a low coding rate, specifically 1/3. For FIG. 7B there are a total of 40 payload bits that result in a total of 128 coded bits. For FIG. 7B the decoding utilized a non-CRC-aided list decoder with the list size 32. Encoding according to these teachings at a low coding rate still exhibit gain over repetitive coding according to conventional LTE, though the gain is less pronounced than at high coding rates as at FIG. 7A. Based on these simulation results plotted at FIGS. 7A-B it can be concluded that the proposed polar coded NR-PBCH with multiple segments outperforms the prior art scheme with repetitive segmentation.

Compared to the legacy LTE's PBCH design, the encoding design set forth herein also has the option of sending the PBCH less frequently than in LTE (where for example LTE sends a SS-block every 40 ms) with a lower coding rate (with the cost of payload or increased number of RE's). The lower coding rate ensures good one-shot detection performance. As mentioned above this one-shot performance can be improved by receiving different segments from different antennas at different receive power, and such multi-shot detection of segments encoded according to these teachings provides another gain improvement over the legacy repetition approach.

Figure 8:
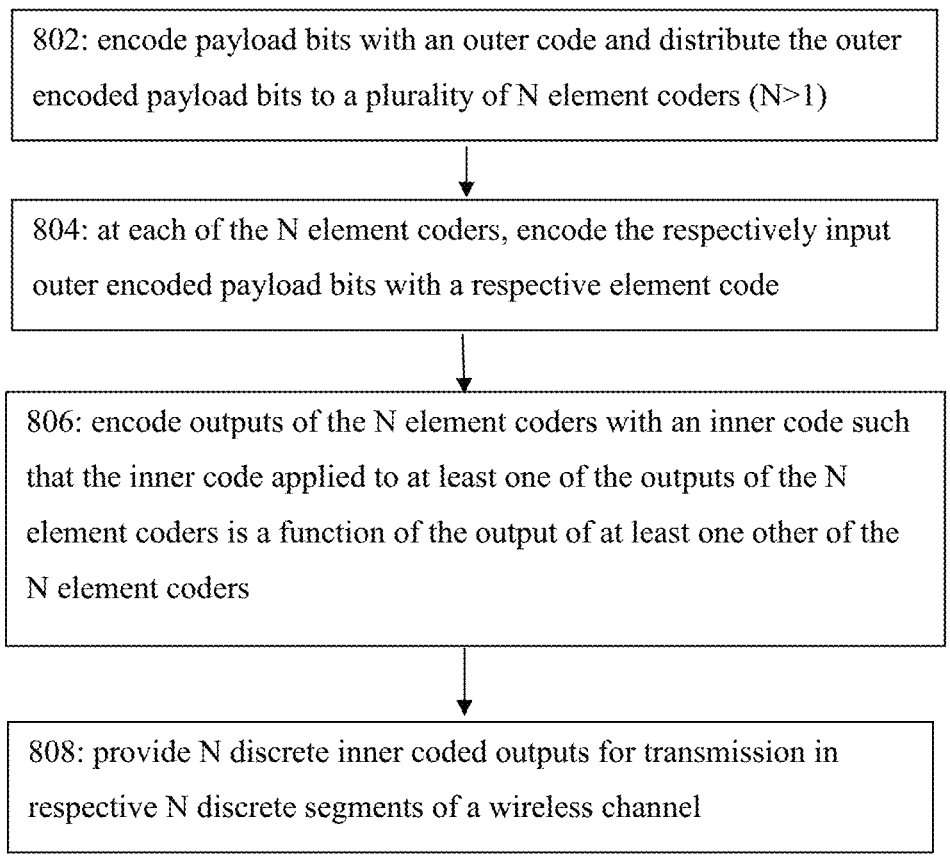
FIG. 8 is a process flow diagram illustrating a particular embodiment of these teachings from the perspective of the described radio access node.

FIG. 8 is a process flow diagram illustrating a particular embodiment of these teachings from the perspective of the described gNB, or more generally from the perspective of the network radio access node and more specifically from the perspective of the encoder of such a radio access node. At block 802 the encoder such as that shown at FIG. 4 encodes payload bits 410 with an outer code 412 and distributes the outer encoded payload bits to a plurality of N element coders 414-1, 414-2, 414-N, where N is an integer greater than one and in the above examples N=3 or 4. Block 804 specifies that for each of the N element coders 414-1, 414-2, 414-N, the respectively input outer encoded payload bits are encoded with a respective element code. Block 806 reflects the inner coding; namely the outputs of the N element coders are encoded with an inner code such that the inner code applied to at least one of the outputs of the N element coders is a function of the output of at least one other of the N element coders. This was the cross-coding in the above examples and was described in various implementations as an XOR operation on all but the first of the N element coder outputs. Finally at block 808 there are exactly N discrete inner coded outputs that are provided for transmission in respective N discrete segments of a wireless channel, and this reflects the correspondence between the individual element coders 414-1, 414-2, 414-N and the individual ones of the N segments of the wireless channel which in the above examples was specifically a broadcast channel.

In one particular embodiment of FIG. 8 each of the respective element codes is a polar code, and in the examples above each of the respective element codes applied by the different N element coders 414-1, 414-2, 414-N was a same polar code.

In another particular example set forth in detail above, encoding the outputs of the N element coders with the inner code as block 806 of FIG. 8 generalizes was done for two of the element coder outputs as follows: the encoded output of a first of the N element coders that is the input to block 806 was passed as a first of the N discrete inner coded outputs at block 808 for transmission in a first discrete segment of the wireless channel; and at block 806 also the encoded output of the first of the N element coders was logically combined with an output of a second of the N element coders to provide at block 808 a second of the N discrete inner coded outputs for transmission in a second discrete segment of the wireless channel.

While all the examples above had the function at block 806 as an exclusive-OR logical function, this was a non-limiting example and the inner coder 416 can operate with other logical functions to impose the inner code. For the specific examples above for N=3 or 4 which did use an XOR function at block 806, the encoding at block 806 further had several examples in which the outputs of at least three of the N element coders were logically combining via exclusive OR operations; for example for N=4 FIG. 5 illustrates for segment #3 that the output of the inner encoder 516 was the output of the third element coder 514-3 XORed with the previous segment #2 which itself was generated by XORing with its previous segment #1.

Transmission of the different N segments by different transmit antennas was detailed above with respect to FIG. 6. Particularly in a massive MIMO system such as NR/5G is being developed to be, there will be in each gNB cell a plurality of transmit antennas and each of the beams 1-4 shown at FIG. 6 can represent one set of such cell-wide transmit antennas. In a particular embodiment these sets are mutually exclusive of one another. In this regard the method described by FIG. 8 can be further considered to transmit each of the N discrete inner coded outputs that are provided at block 808 in respective N discrete segments of transmission. While the examples above assume that FIG. 8 represents steps or actions performed by a gNB operating in a new radio/5G radio access technology where the payload bits of block 802 are system information and the wireless channel is a broadcast channel, this is only one particular deployment scenario for these teachings.

The specific elements shown at FIG. 8 and described more fully above from the perspective of the radio network may be considered as steps or elements of a method, or actions performed by a gNB or more specifically by an encoder within such a gNB, or actions caused by executing a computer program tangibly stored on a memory of such a gNB or encoder.

Figure 9:
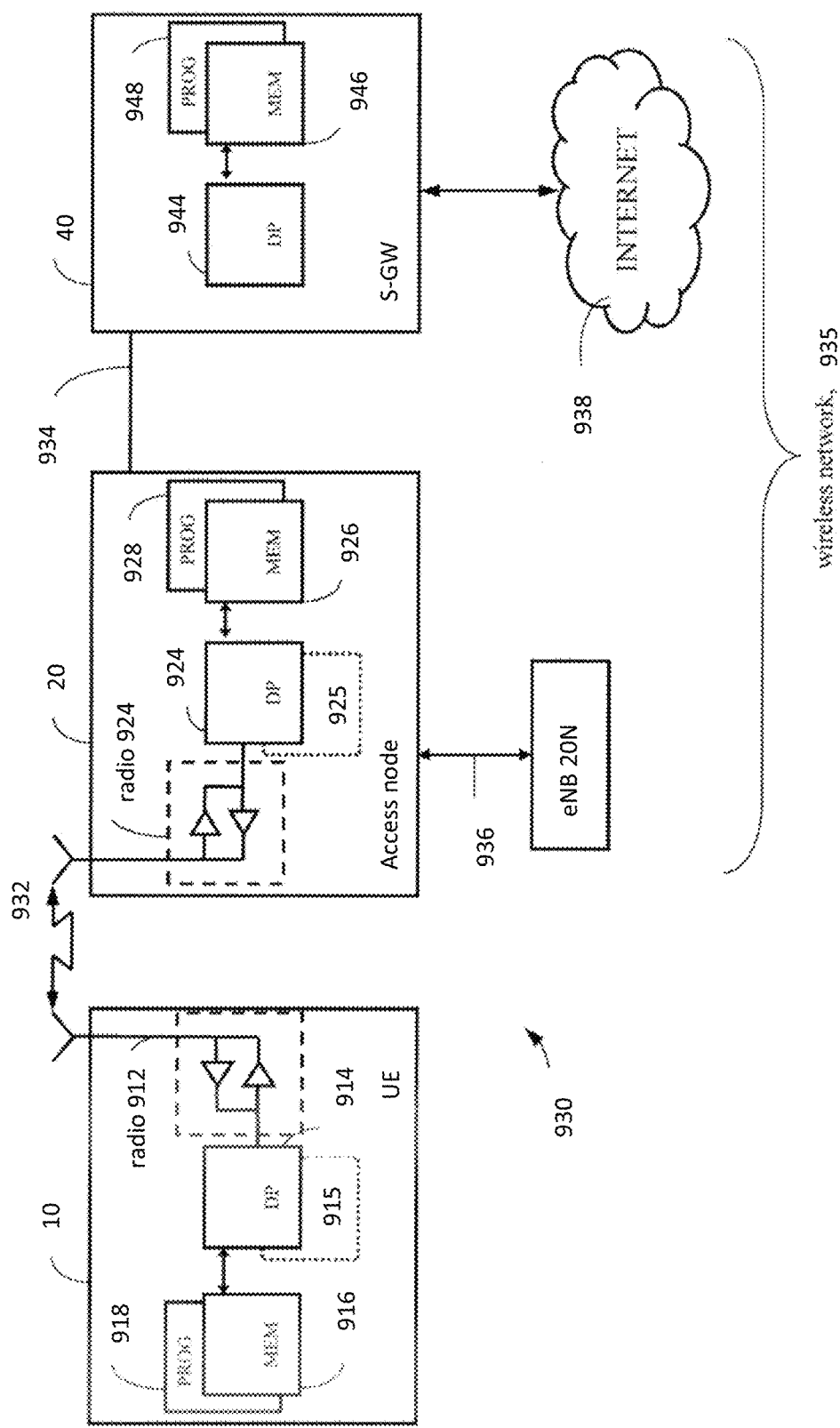
FIG. 9 is a high level schematic block diagram showing further components of the radio access node and UE that are suitable for practicing certain aspects of these teachings.

FIG. 9 is a high level diagram illustrating some relevant components of various communication entities that may implement various portions of these teachings, including a base station identified generally as a radio network access node 20, a serving gateway (S-GW) 40, a user equipment (UE) 10, and a neighbor cell/neighbor gNB 20N. In the wireless system 930 of FIG. 9 a communications network 935 is adapted for communication over a wireless link 932 with an apparatus, such as a mobile communication device which may be referred to as a UE 10, via the radio network access node 20. The network 935 may include a S-GW 40 that provides connectivity with other and/or broader networks such as a publicly switched telephone network and/or a data communications network (e.g., the internet 938).

The UE 10 includes a controller, such as a computer or a data processor (DP) 914 (or multiple ones of them), a computer-readable memory medium embodied as a memory (MEM) 916 (or more generally a non-transitory program storage device) that stores a program of computer instructions (PROG) 918, and a suitable wireless interface, such as radio frequency (RF) transceiver or more generically a radio 912, for bidirectional wireless communications with the radio network access node 20 via one or more antennas. In general terms the UE 10 can be considered a machine that reads the MEM/non-transitory program storage device and that executes the computer program code or executable program of instructions stored thereon. While each entity of FIG. 9 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices, cellular telephones, smartphones, wireless terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The radio network access node 20 also includes a controller, such as a computer or a data processor (DP) 924 (or multiple ones of them), a computer-readable memory medium embodied as a memory (MEM) 926 that stores a program of computer instructions (PROG) 928, and a suitable wireless interface, such as a RF transceiver or radio 922, for communication with the UE 10 via one or more antennas. The radio network access node 20 is coupled via a data/control path 934 to the S-GW 40. The path 934 may be implemented as an S1 interface.

The radio network access node 20 may also be coupled to other radio network access nodes such as the illustrated gNB 20N via data/control path 936, which may be implemented as an X5 interface. At the level of detail shown at FIG. 9 the gNB 20N has components substantially similar to those detailed above for the radio network access node 20, and will not be repeated therefor.

The S-GW 940 includes a controller, such as a computer or a data processor (DP) 944 (or multiple ones of them), a computer-readable memory medium embodied as a memory (MEM) 946 that stores a program of computer instructions (PROG) 948.

At least one of the PROGs 918, 928 is assumed to include program instructions that, when executed by the associated one or more DPs, enable the device to operate in accordance with exemplary embodiments of this invention. That is, various exemplary embodiments of this invention may be implemented at least in part by computer software executable by the DP 914 of the UE 10; and/or by the DP 924 of the radio network access node 20 and the gNB 20N; and/or by hardware, or by a combination of software and hardware (and firmware).

For the purposes of describing various exemplary embodiments in accordance with this invention the UE 10 is shown to include a dedicated processor 915 that implements a decoder according to these teachings, and the radio network access node 20 also includes a dedicated processor 925 that implements an encoder such as the outer-element-inner encoder 400 shown at FIG. 4. Computer programs implementing these teachings may be stored in a computer readable memory of such dedicated processors 915/925, or in a memory 916/926 as shown separate and distinct from such dedicated processors 915/925.

The computer readable MEMs 916, 926 and 946 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 914, 924 and 944 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 912 and 922) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

The following abbreviations that may be found in the specification and/or the drawing figures are defined as follows:

3GPP Third Generation Partnership Project
BI-DMC binary-input, discrete, memoryless channel
BLER block error rate
CRC cyclic redundancy check
DL downlink
DMRS dedicated modulation reference symbol
eMBB enhanced mobile broadband
E-UTRAN evolved UMTS radio access network
LTE long term evolution (of E-UTRAN)
MCS modulation coding selection
MIMO multiple-input multiple-output
NR new radio
NR-PBCH new radio physical broadcast channel
PBCH physical broadcast channel
RACH random access channel
RE resource element
RS reference symbol
SNR signal noise radio
SS secondary synchronization
TBCC tail-bite convolutional code
Tx transmission
UE user equipment
UL uplink
XOR exclusive OR

What is claimed is:

1. A method to encode data for multiple-segment transmission in a broadcast channel, comprising:
   encoding, at an outer coder, payload bits with an outer code and distributing the outer encoded payload bits to each of N element coders, where N is an integer greater than one;
   encoding, at each of the N element coders, the respectively input outer encoded payload bits with a respective element code, wherein each of the respective element codes is a polar code;
   encoding, at an inner coder, outputs of the N element coders with an inner code to produce N discrete inner coded outputs such that N−1 of the N discrete inner coded outputs encode the combined outputs of more than one of the N element coders; and
   providing, from the inner coder, the N discrete inner coded outputs for transmission in a respective discrete segment of N discrete segments of a wireless channel, wherein the N discrete segments have different lengths.

2. The method according to claim 1, wherein each of the respective element codes is a same polar code.

3. The method according to claim 1, wherein encoding the outputs of the N element coders with the inner code comprises:
   passing the encoded output of a first of the N element coders as a first of the N discrete inner coded outputs for transmission in a first discrete segment of the N discrete segments of the wireless channel; and
   logically combining the encoded output of the first of the N element coders with the encoded output of a second of the N element coders to provide a second of the N discrete inner coded outputs for transmission in a second discrete segment of the N discrete segments of the wireless channel.

4. The method according to claim 1, wherein the inner code applied to an output of at least one of the N element coders is a function of an output of at least one other of the N element coders, wherein the function is an exclusive-OR logical function.

5. The method according to claim 1, wherein N is at least three and encoding outputs of the N element coders with the inner code comprises:
   logically combining via exclusive OR operations the outputs of at least three of the N element coders.

6. The method according to claim 1, further comprising:
   transmitting each of the provided N discrete inner coded outputs in the respective discrete segment of the N discrete segments of transmission.

7. The method according to claim 1, wherein the method is performed with an antenna element associated with a network radio access node operating in a new radio/5G radio access technology, the payload bits comprise system information, and the wireless channel is a broadcast channel.

8. An apparatus comprising:
   at least one computer readable non-transitory memory storing computer program instructions; and
   at least one processor;
   wherein the at least one computer readable non-transitory memory with the computer program instructions is configured, with the at least one processor, to cause the apparatus to perform actions to encode data for multiple-segment transmission in a broadcast channel, said actions comprising:
      encode, at an outer code, payload bits with an outer code and distribute the outer encoded payload bits to each of N element coders, where N is an integer greater than one;
      encode, at each of the N element coders, the respectively input outer encoded payload bits with a respective element code, wherein each of the respective element codes is a polar code;
      encode, at an inner coder, outputs of the N element coders with an inner code to produce N discrete inner coded outputs such that N−1 of the N discrete inner coded outputs encode the combined outputs of more than one of the N element coders; and
      provide, from the inner coder, the N discrete inner coded outputs for transmission in a respective discrete segment of N discrete segments of a wireless channel, wherein the N discrete segments have different lengths.

9. The apparatus according to claim 8, wherein encoding the outputs of the N element coders with the inner code comprises:
passing the encoded output of a first of the N element coders as a first of the N discrete inner coded outputs for transmission in a first discrete segment of the N discrete segments of the wireless channel; and
logically combining the encoded output of the first of the N element coders with the encoded output of a second of the N element coders to provide a second of the N discrete inner coded outputs for transmission in a second discrete segment of the N discrete segments of the wireless channel.

10. The apparatus according to claim 8, wherein the inner code applied to an output of at least one of the N element coders is a function of an output of at least one other of the N element coders, wherein the function is an exclusive-OR logical function.

11. The apparatus according to claim 8, wherein N is at least three and encoding outputs of the N element coders with the inner code comprises:
logically combining via exclusive OR operations the outputs of at least three of the N element coders.

12. The apparatus according to claim 8, the actions further comprising:
transmit each of the provided N discrete inner coded outputs in the respective discrete segment of the N discrete segments of transmission.

13. The apparatus according to claim 8, wherein the apparatus is an antenna element associated with a network radio access node operating in a new radio/5G radio access technology, the payload bits comprise system information, and the wireless channel is a broadcast channel.

14. A computer readable non-transitory memory storing computer program instructions that, when executed with one or more processors, cause an apparatus to perform actions to encode data for multiple-segment transmission in a broadcast channel, said actions comprising:
encode, at an outer coder, payload bits with an outer code and distribute the outer encoded payload bits to each of N element coders, where N is an integer greater than one;
encode, at each of the N element coders, the respectively input outer encoded payload bits with a respective element code, wherein each of the respective element codes is a polar code;
encode, at an inner coder, outputs of the N element coders with an inner code to produce N discrete inner coded outputs such that N−1 of the N discrete inner coded outputs encode the combined outputs of more than one of the N element coders; and
provide, from the inner coder, the N discrete inner coded outputs for transmission in a respective discrete segment of N discrete segments of a wireless channel, wherein the N discrete segments have different lengths.

15. The computer readable non-transitory memory according to claim 14, wherein encoding the outputs of the N element coders with the inner code comprises:
passing the encoded output of a first of the N element coders as a first of the N discrete inner coded outputs for transmission in a first discrete segment of the N discrete segments of the wireless channel; and
logically combining the encoded output of the first of the N element coders with the encoded output of a second of the N element coders to provide a second of the N discrete inner coded outputs for transmission in a second discrete segment of the N discrete segments of the wireless channel.

16. The computer readable non-transitory memory according to claim 14, wherein N is at least three and encoding outputs of the N element coders with the inner code comprises:
logically combining via exclusive OR operations the outputs of at least three of the N element coders.

17. The computer readable non-transitory memory according to claim 14, the actions further comprising:
transmit each of the provided N discrete inner coded outputs in the respective discrete segment of the N discrete segments of transmission.

* * * * *